United States Patent
Lesartre et al.

(10) Patent No.: US 12,450,069 B2
(45) Date of Patent: Oct. 21, 2025

(54) NIC LINE-RATE HARDWARE PACKET PROCESSING

(71) Applicant: Hewlett Packard Enterprise Development LP, Spring, TX (US)

(72) Inventors: Gregg Bernard Lesartre, Fort Collins, CO (US); Anthony M. Ford, Bristol (GB)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 18/796,511

(22) Filed: Aug. 7, 2024

(65) Prior Publication Data

US 2024/0394065 A1    Nov. 28, 2024

Related U.S. Application Data

(63) Continuation of application No. 18/092,837, filed on Jan. 3, 2023, now Pat. No. 12,067,397.

(51) Int. Cl.
G06F 9/38    (2018.01)

(52) U.S. Cl.
CPC .................. G06F 9/3824 (2013.01)

(58) Field of Classification Search
None
See application file for complete search history.

(56) References Cited

U.S. PATENT DOCUMENTS 10,979,353 B2 *  4/2021  Bosshart ............... H04L 45/74
11,115,333 B2 *  9/2021  Sheldon .............. H04L 45/7452
11,374,859 B2    6/2022  Subrahmanya et al.
11,641,321 B2    5/2023  Koponen et al.
(Continued)

FOREIGN PATENT DOCUMENTS

| CN | 111684769 A | 9/2020 |
| DE | 112020001833 T5 | 1/2022 |
| EP | 3952215 A1 | 2/2022 |

OTHER PUBLICATIONS

Bosshart, P., et al., "P4: Programming protocol-independent packet processors." ACM SIGCOMM Computer Communication Review, vol. 44, Issue 3, May 15, 2014, pp. 87-95.
(Continued)

*Primary Examiner* — Michael Sun
(74) *Attorney, Agent, or Firm* — Yao Legal Services, Inc.

(57) ABSTRACT

A packet-processing method includes looking up a first match-action table on a network interface card (NIC) for a received packet; in response to finding a matching entry indicating an action, queuing the received packet in a first queue and storing the action data in an instruction memory; and responsive to not finding a matching entry, queuing the received packet in the first queue and a second queue. The method includes selecting a first packet from the first queue for processing, which comprises performing a corresponding action stored in the instruction memory; selecting a second packet from the second queue for processing, which comprises forwarding a portion of the second packet to a processor, which looks up a second match-action table; and receiving, from the processor, a lookup result, thereby allowing a third packet in the first queue corresponding to the second packet to be processed based on the lookup result.

20 Claims, 9 Drawing Sheets

(56) References Cited

U.S. PATENT DOCUMENTS

| | | | |
|---|---|---|---|
| 2017/0180273 A1* | 6/2017 | Daly | ............ H04L 69/324 |
| 2019/0081891 A1 | 3/2019 | Mundkur et al. | |
| 2020/0059485 A1 | 2/2020 | Ergin et al. | |
| 2020/0314011 A1 | 10/2020 | Deval et al. | |
| 2020/0336425 A1 | 10/2020 | Galles et al. | |
| 2021/0112003 A1 | 4/2021 | Marolia et al. | |
| 2022/0045945 A1 | 2/2022 | Subrahmanya et al. | |

OTHER PUBLICATIONS

In-band Network Telemetry (INT) Dataplane Specification. GitHub—p4-applications/INT_v2_1.pdf at master • p4lang/p4-applications, retrieved from : https://github.com/p4lang/p4-applications/tree/master/docs, retrieved on : Jan. 23, 2023, pp. 1.

Mininet: Rapid Prototyping for Software Defined Networks. GitHub—mininet/mininet.github.com: Website for the Mininet Project. Retrieved from: https://github.com/mininet/mininet.github.com, retrieved on: Jan. 23, 2023.

* cited by examiner

NIC LINE-RATE HARDWARE PACKET PROCESSING

CROSS-REFERENCE TO RELATED APPLICATION

This application is a continuation of U.S. patent application Ser. No. 18/092,837, which was filed on Jan. 3, 2023, which is herein included by reference in its entirety for all purposes.

BACKGROUND

Field

This disclosure is generally related to packet processing in a network interface card (NIC). More specifically, this disclosure is related to a hardware-based packet-processing engine capable of offloading overflow processing to a processor.

BRIEF DESCRIPTION OF THE FIGURES

In the figures, like reference numerals refer to the same figure elements.

DETAILED DESCRIPTION

Figure 1:
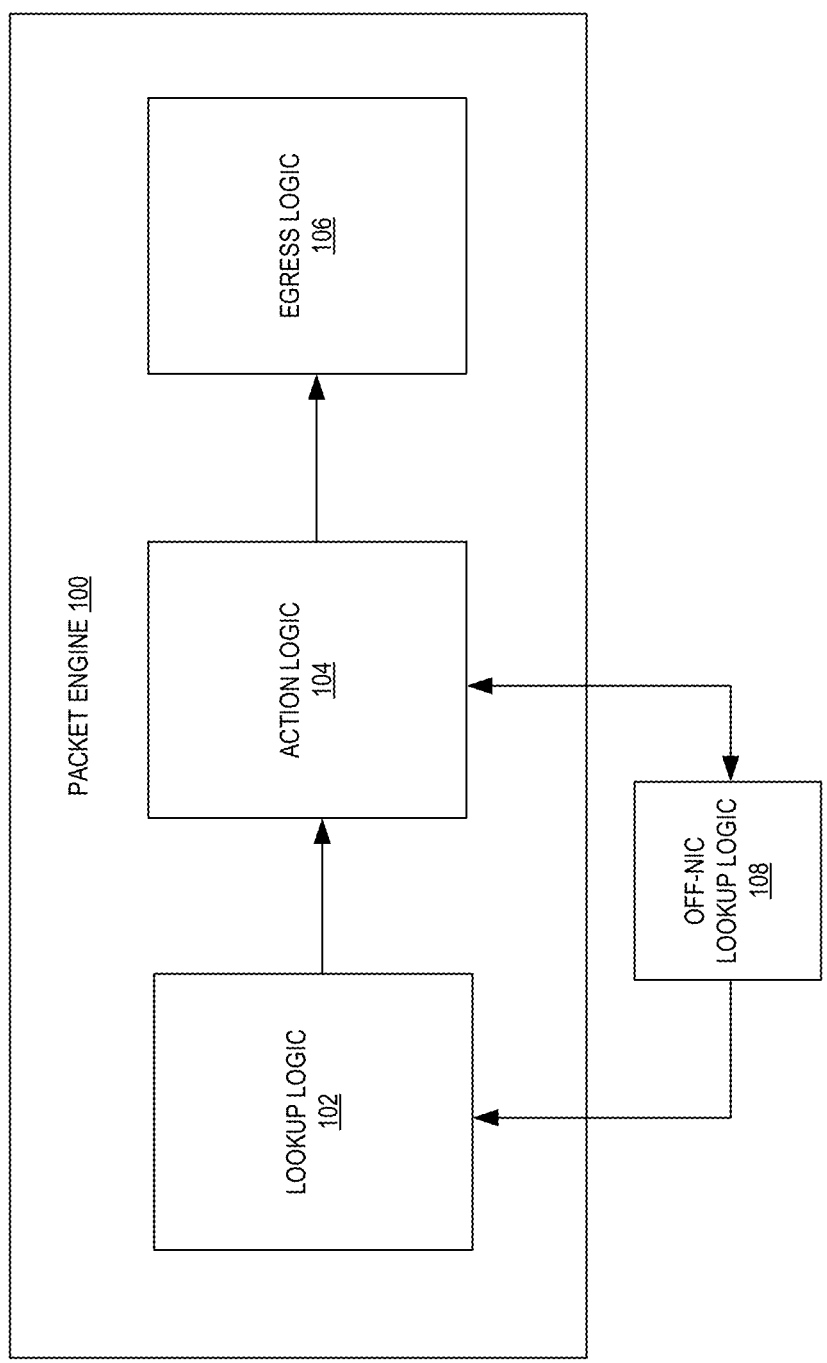
FIG. 1 presents a diagram illustrating an example of a high-level schematic of a packet engine, according to one aspect.

The following description is presented to enable any person skilled in the art to make and use the embodiments and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the scope of the present disclosure is not limited to the embodiments shown but is to be accorded the widest scope consistent with the principles and features disclosed herein.

Hardware-based packet-processing at the network interface card (NIC) of a processor is needed to meet the bandwidth requirements of high-performance computing (HPC). Many hardware-based packet-processing engines (e.g., a P4 (Programming Protocol-independent Packet Processors) packet engine pipeline) can implement a match-action table to determine how a packet is to be processed before issuing. The match-action table can include a plurality of entries, with each entry comprising a match field or multiple match fields and a corresponding collection of packet-handling actions. In addition to the large bandwidth, HPC customers are increasingly demanding features that can support security and isolation of workloads running simultaneously on a system. In order to support a large number of tenants sharing the NIC and the processor, the packet engine on the NIC needs to implement a sufficiently large match-action table (e.g., a table that may be a few gigabytes in size). However, such a large match-action table is beyond the memory capacity of conventional NICs, which typically may have tens of megabytes of memory space.

This disclosure provides a hardware-based packet engine implementing a larger off-NIC match-action table in addition to a smaller on-NIC match-action table. Subsequent to receiving a packet for processing, the packet engine can parse the packet header and perform a match-action lookup in the smaller on-NIC match-action table based on information included in the packet header. Packets with a matching entry (i.e., the match field of the entry matches one or more header fields of a packet) in the on-NIC match-action table can be queued in packet-class-specific queues based on respective classes to which the packets belong. The packets can be classified based on a variety of criteria (e.g., traffic class, priority class, source/destination subnet, etc.). The scope of this disclosure is not limited by the criteria used for classifying packets. On the other hand, a packet without a matching entry in the on-NIC match-action table can be sent to, in addition to a corresponding packet-class-specific queue, a special queue, referred to as a fill-request queue. A packet in the fill-request queue can be processed through the packet engine like a normal packet, with the default action being sending the packet header to a fill-request handler running at a processor. The fill-request handler can perform a match-action lookup in a larger match-action table stored in the processor's DRAM and return the lookup result to the packet engine, which can then add the result to the on-NIC match-action table and process the packet accordingly. The use of the packet-class-specific queues ensures that a packet without a matching entry in the on-NIC match-action table does not prevent the flow of packets belonging to other classes. Packets of different classes can be queued in other packet-class-specific queues and processed according to their corresponding match-action entries. For packets within the same class, the size of the packet-class-specific queue can be designed to be sufficiently large such that it is highly probable that a response to the fill-request (i.e., the result of the lookup) can arrive at the packet engine before queue(s) with the unmatched packets are filled up, thus allowing the uninterrupted flow of the packets within the same packet-class queue.

FIG. 1 presents a diagram illustrating an example of a high-level schematic of a packet engine, according to one aspect. Packet engine 100 can be part of a NIC and can include a lookup logic 102, an action logic 104, and an egress logic 106. The various logics in packet engine 100 can be implemented using hardware or software logic. According to some aspects, the various logics in packet engine 100 can be implemented using hardware to ensure that the packet-processing speed can meet the HPC bandwidth requirements.

Lookup logic 102 can be responsible for performing the match-action lookup to determine an action to be performed on an incoming packet. For example, lookup logic 102 can receive packets (e.g., Ethernet packets) from an external or loopback interface of the NIC and parse the packets to extract the header fields to be used in the match-action lookup operation. More particularly, lookup logic 102 can search an on-NIC match-action table (which can be implemented using a content-addressable memory (CAM) or as a hash table stored in a random-access memory (RAM)) using the extracted header fields as search keys. For example, a matching entry in the table can have a match field that matches one or more header fields of a packet. According to some aspects, the size of the on-NIC match-action table can be a few megabytes. The match-action table can define a number of actions to be performed on the incoming packets, including but not limited to: modification, steering, filtering of the packets; triggering updates to the packet engine states; or other management functions such as gathering and reporting telemetry information. The lookup result (i.e., the matching entries) from lookup logic 102 can be forwarded to action logic 104, which is responsible for applying a set of actions to the incoming packet based on the action rules included in the lookup result. Egress logic 106 can be responsible for issuing the packets to other network nodes (e.g., via the network fabric). In this example, the NIC (on which packet engine 100 resides) can be interconnected with other NICs via a network fabric comprising various types of network devices (e.g., switches, routers, access points, etc.).

Note that the on-NIC match-action table may not be large enough to handle all the connections that may be valid at any given time. If the lookup result of lookup logic 102 indicates a miss (i.e., no match-action entry is found in the on-NIC match-action table for the incoming packet), action logic 104 can perform a default action, which is to forward the incoming packet (or a portion of the packet including its header) to off-NIC lookup logic 108. According to some aspects, off-NIC lookup logic 108 can reside on a processor coupled to the NIC. Off-NIC lookup logic 108 can perform a match-action lookup in a larger match-action table (e.g., a match-action table stored in a dynamic random-access memory (DRAM) attached to the processor). In theory, the larger match-action table can have an arbitrary size to include all possible match-action entries in the network including those that cannot fit into the smaller match-action table on the NIC. Off-NIC lookup logic 108 can return the lookup result to action logic 104 such that appropriate actions can be performed on the incoming packet. In addition, off-NIC lookup logic 108 can also return the lookup result to lookup logic 102 such that the result can be added to the on-NIC match-action table. By performing the default action in the event of lookup logic 102 failing to find a match-action entry, action logic 104 can treat the unmatched packet (i.e., the packet without a matching entry in the on-NIC match-action) in a way similar to the matched packet (i.e., the packet with a matching entry), thus simplifying the operation of action logic 104.

To prevent an unmatched packet from blocking the traffic or going out of order while waiting for the lookup result from off-NIC lookup logic 108, packet engine 100 can implement a specially designed queuing structure (not shown in FIG. 1) to hold packets processed by lookup logic 102 before action logic 104 applies the actions on the packets. According to some aspects, the queueing structure can include a number of separate logic queues for queuing packets belonging to different packet classes, one logic queue for each packet class. These logic queues can be referred to as packet-class-specific queues because they are specific to certain classes to which the packets belong. There are different criteria that can be used to classify packets. In one example, the packets can be classified based on their traffic classes, and these logic queues can be traffic-class-specific queues. Note that packets from different classes flow through the packet engine independently of one another, and the packet-class-specific queues also advance independently of one another. In addition to the packet-class-specific queues, the queuing structure can include a special queue, referred to as a fill-request queue, for holding unmatched packets. More specifically, an unmatched packet can be queued into both a corresponding packet-class-specific queue and the fill-request queue.

When an unmatched packet is dequeued from the fill-request queue, action logic 104 can perform a default action on the dequeued packet, which is to forward the unmatched packet to off-NIC lookup logic 108. To reduce bandwidth usage, according to some aspects, action logic 104 can extract the packet header and forward only the packet header to off-NIC lookup logic 108. According to alternative aspects, action logic 104 can truncate the packet (e.g., preserving only a predetermined initial portion of the packet while discarding the rest of the packet) and forward the truncated packet (which includes the packet header) to off-NIC lookup logic 108. Off-NIC lookup logic 108 can include a fill-request handler executed by a management-service processor on a side port of the NIC. Alternatively, the fill-request handler can be executed by a processor attached to the fabric or by the host processor of the NIC. The fill-request handler may also include purposely built hardware for responding to fill-requests. The fill-request handler can perform match-action lookup operations in a larger match-action table maintained in the DRAM of the processor. According to one aspect, the size of this larger match-action table can be a few gigabytes. Note that the processor executing the fill-request handler can be the same processor responsible for managing all structures in packet engine 100. Hence, the processor is capable of adding entries to the larger match-action table as connections are established, deleting entries as connections are closed, and modifying entries as desired to implement "stateful" packet processing.

Figure 2:
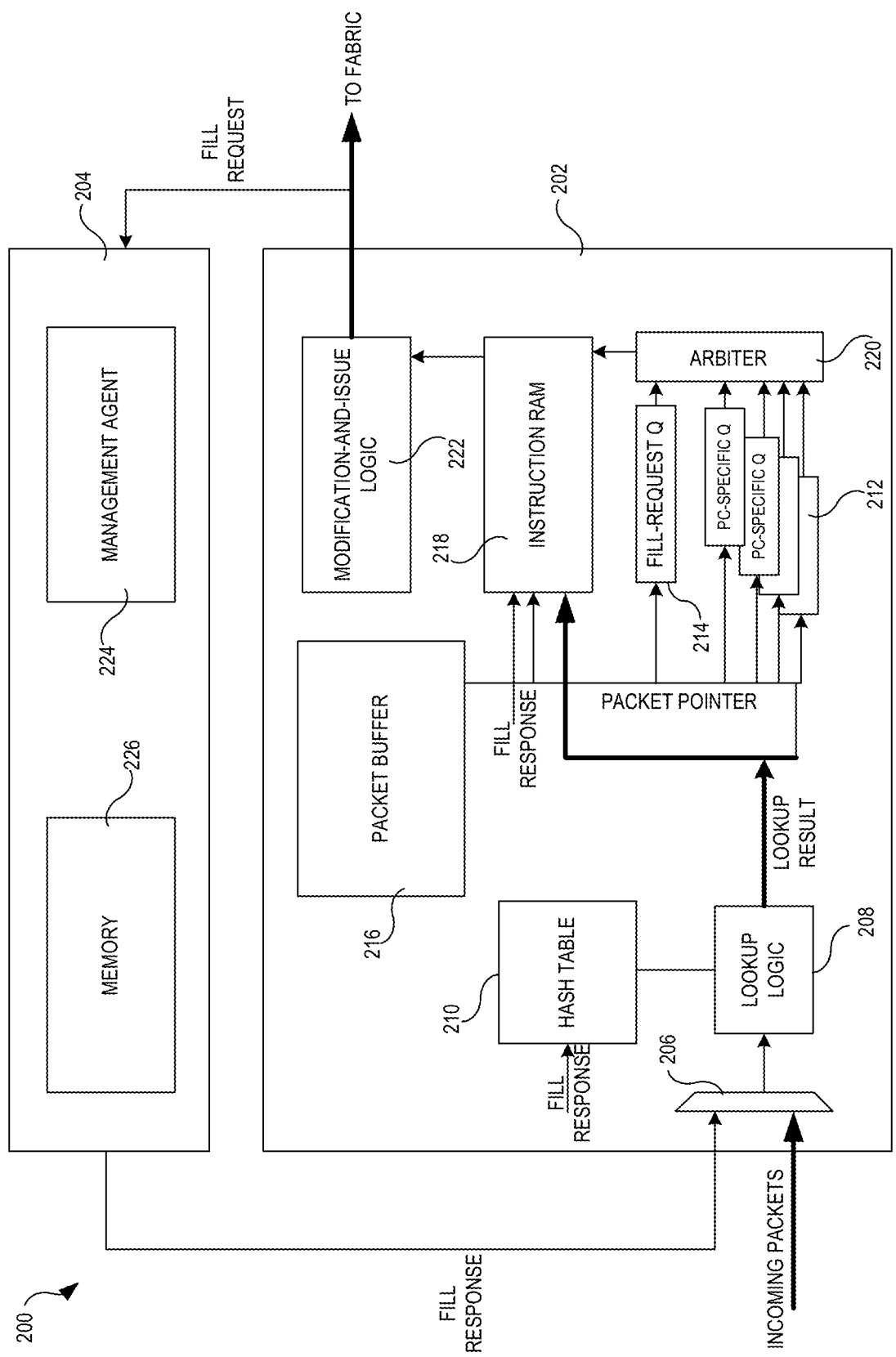
FIG. 2 presents a diagram illustrating an example of a packet-processing system, according to one aspect.

FIG. 2 presents a diagram illustrating an example of a packet-processing system, according to one aspect. Packet-processing system 200 can include a NIC 202 and a processor 204. According to some aspects, processor 204 can be the host processor of NIC 202. According to alternative aspects, processor 204 can be a separate management processor coupled to NIC 202 via a side port on NIC 202. Processor 204 can also be a management processor attached to the fabric.

NIC 202 can include a number of hardware logics as well as memories to form a hardware-based packet-processing pipeline. In the example shown in FIG. 2, NIC 202 can include a multiplexer 206, a lookup logic 208, a hash table 210, a plurality of packet-class-specific queues 212, a fill-request queue 214, a packet buffer 216, an instruction RAM 218, an arbiter 220, and a modification-and-issue logic 222. Processor 204 can include a management agent 224 and a memory 226.

Incoming packets arriving at NIC 202 can be sent to lookup logic 208 via multiplexer 206. Lookup logic 208 can include a packet parser (not shown in FIG. 2) that can parse an incoming packet to extract its header fields (e.g., L1, L2, L3, and L4 header fields). Lookup logic 208 can perform a match-action lookup based on the extracted header fields. In this example, lookup logic 208 can search hash table 210 (i.e., the match-action table) for entries that match the extracted header fields of the incoming packet. There can be multiple hash tables, one for each header field. In addition to hash tables, other types of lookup structures (e.g., CAMs) can also be used to implement the match-action tables. Subsequent to the match-action lookup, the packets can be queued in packet-class-specific queues 212 based on their corresponding packet classes. More specifically, the packets themselves are stored in packet buffer 216 and the corresponding packet pointers are queued in packet-class-specific queues 212. Depending on the communication protocols, there can be different ways to classify packets. According to some aspects, packets can be classified based on priorities such that each packet-class-specific queue is to queue packets belonging to a specific priority class. According to one aspect, there can be 12 packet classes and NIC 202 can include 12 corresponding packet-class-specific queues.

After performing the lookup operation for an incoming packet, lookup logic 208 can send the lookup result along with the packet to facilitate the queueing of the packet. The lookup result can indicate whether the match-action lookup finds a matching entry in the match-action table(s). If the lookup result indicates that no matching entry is found for the packet, the packet is referred to as an unmatched packet, and in addition to being queued in a corresponding packet-class-specific queue 212, the unmatched packet is also queued in fill-request queue 214. Fill-request queue 214 can also be referred to as a miss queue, because it is queuing packets without a matching action. For a matched packet with one or more matching entries in the match-action table(s), the lookup result can include those matching entry results and can be stored in instruction RAM 218. Each matching entry can specify one or more actions to be performed on the packet.

Arbiter 220 can be responsible for selecting packets to be issued. In FIG. 2, arbiter 220 can select, from the plurality of queues including packet-class-specific queues 212 and fill-request queue 214, one queue at a time for dequeuing (i.e., to remove the head of the selected queue). Arbiter 220 can make the selection based on the priority of each queue. According to some aspects, fill-request queue 214 can have a relatively high priority (which may not be necessarily the highest) to ensure that the unmatched packets can be processed in a timely manner. Other arbitration mechanisms can also be used by arbiter 220. Once a packet is removed from the selected queue, it can be sent to modification-and-issue logic 222 for processing and issue. More specifically, modification-and-issue logic 222 can access instruction RAM 218 to obtain the corresponding match-action lookup result, which specifies action(s) to be performed on the packet. Subsequent to being processed (i.e., having the specified action(s) performed on it), the packet can be issued to the fabric.

For an unmatched packet removed from fill-request queue 214, instruction RAM 218 can store data associated with a default action. According to some aspects, in response to detecting that the match-action lookup result for a packet indicates a miss or no match being found in hash table 210, instruction RAM 218 can generate an action entry for the packet, specifying that the default action is to be performed on the packet. According to some aspects, the default action can include forwarding a fill request to processor 204, as shown in FIG. 2. The fill request can include the unmatched packet or a portion of the unmatched packet. To reduce bandwidth usage, the unmatched packet can be truncated, and a predetermined number of initial bytes of the packet (which can include the packet header) can be sent to processor 204. Because the packets may have different encapsulations, they may have headers of different lengths. The number of bytes included in the truncated packet can be designed to ensure that the header of each packet, regardless of the protocol used, can be included in the truncated packet.

Processor 204 can include a management agent 224 and a memory 226. Management agent 224 (which can be a process executed by processor 204) can examine the header of the unmatched packet to generate a fill response, which can indicate one or more entries to be inserted/filled into hash table 210 to allow the packet to proceed through the packet engine. According to some aspects, memory 226 of processor 204 can maintain a larger match-action table (which can be a few magnitudes larger than hash table 210). In one example, the size of hash table 210 can be a few megabytes (e.g., 2 MB), and the size of the larger match-action table in memory 226 can be a few gigabytes (e.g., 2 GB). Upon receiving the fill request (which can include the header fields of the unmatched packet), management agent 224 can perform a match-action lookup in the match-action table stored in memory 226 and generate a fill response that includes the lookup result. In addition to providing fill responses to NIC 202, processor 204 can also be responsible for updating the match-action tables, including both hash table 210 and the larger match-action table in memory 226. For example, processor 204 can add new entries to the match-action tables when connections are established. In certain scenarios, processor 204 may need to remove old entries from the tables to provide space for new entries.

The fill response from processor 204 can be sent to NIC 202. The fill response can enter the packet engine the same way as the incoming new packets (i.e., via multiplexer 206). More particularly, the fill response can be provided to instruction RAM 218 such that appropriate actions can be performed on the corresponding packet when it is removed from-packet-class-specific queue 212. In addition, the fill response can be provided to hash table 210, which can add a corresponding match-action entry such that subsequent packets with a similar header can benefit from the added entry. According to some aspects, a table-update logic associated with hash table 210 can update hash table 210 based on the received fill response. If hash table 210 is full, the table-update logic can remove older entries from hash table 210 to make room for the fill response. According to some aspects, older entries in hash table 210 may age out and be removed automatically after a predetermined time period.

By queuing the packets, including both the matched and unmatched packets, in the packet-class-specific queues, the packet engine on NIC 202 can process traffic continuously even when lookup logic 208 cannot find a matching entry in hash table 210 for every packet. An unmatched packet can be queued in two different queues (i.e., the fill-request queue and the queue for its corresponding packet class). While the unmatched packet is waiting in both queues, packets of other classes can continue to be processed by the packet engine without interruption. In fact, if the depth of the packet-class-specific queue is sufficiently large, even packets within the same class can be processed without interruption. More specifically, previously received packets of the same class can move through the queue while management agent 224 on processor 204 is performing the match-action lookup. There will be no blocking of the flow of this particular class, if the lookup result can be returned to the traffic engine before the unmatched packet reaches the head of the queue. Moreover, because the same unmatched packet is queued not only in the fill-request queue but also the packet-class-specific queue, the unmatched packet will be able to maintain its position in the traffic flow. While the unmatched packet in the fill-request queue is used to issue the fill request, the same unmatched packet in the packet-class-specific queue moves along with other packets in its own class such that the transmission order of packets in the same class (e.g., the same traffic class or the same flow) can be maintained.

Figure 3A:
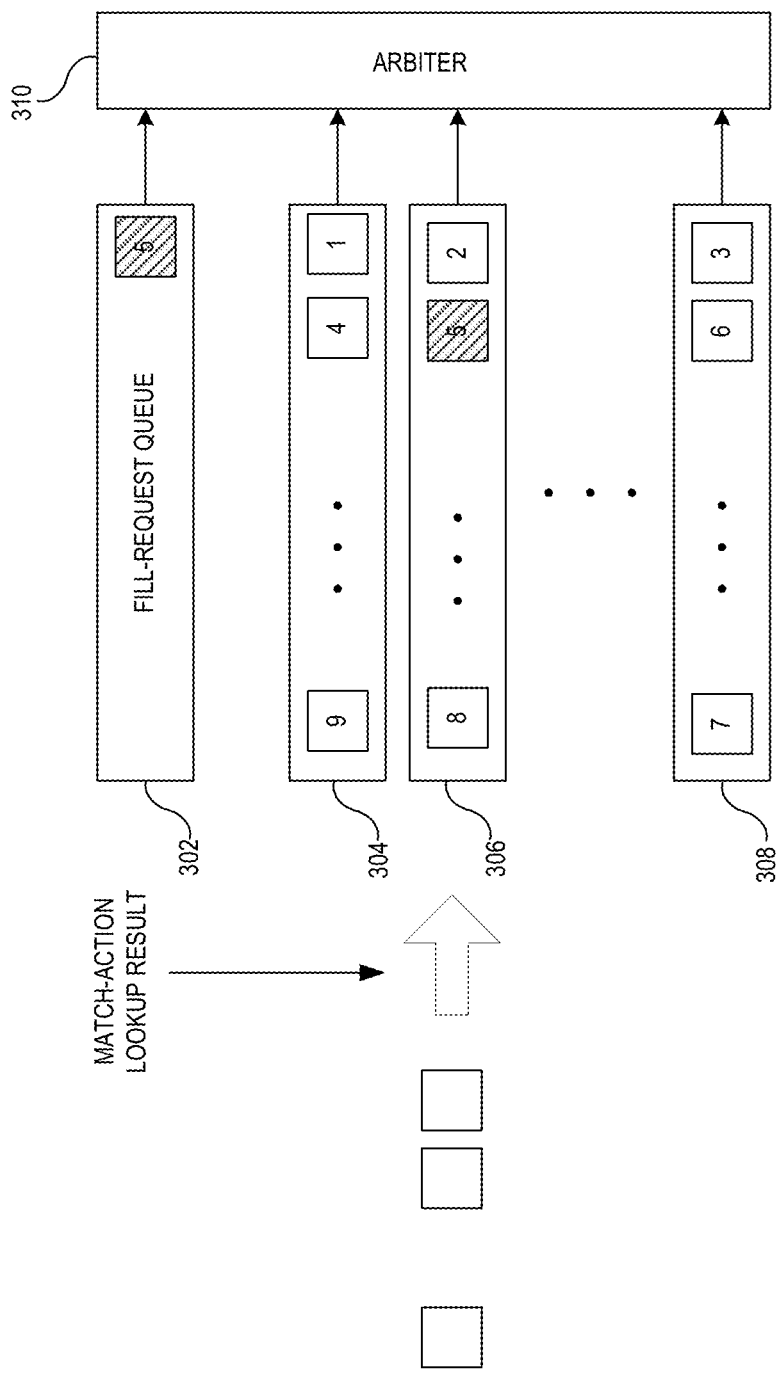
FIGS. 3A-3E illustrate examples of packet queuing and dequeuing scenarios, according to one aspect.

FIGS. 3A-3E illustrate examples of packet queuing and dequeuing scenarios, according to one aspect. FIG. 3A illustrates a number of arbitration queues, including a fill-request queue 302 and packet-class-specific queues 304, 306, and 308. Packets that have been processed by the match-action lookup logic wait in these queues before they are processed by the action logic and issued to the fabric. In the drawings, some of the packets are numbered in order to distinguish one packet from the other. For example, packets 1, 4, and 9 are of the same class and are queued in packet-class-specific queue 304; packets 2, 5, and 8 are of the same class and are queued in packet-class-specific queue 306; and packets 3, 6, and 7 are of the same class and are queued in packet-class-specific queue 308. Moreover, packet 5 is an unmatched packet such that in addition to packet-class-specific queue 306, packet 5 is also queued in fill-request queue 302. Note that packet 5 is shown as shaded to indicate that it is an unmatched packet.

FIG. 3A also shows that the match-action lookup result can be used to facilitate the queuing of the packets. More specifically, the match-action lookup result associated with each packet can indicate whether the packet is an unmatched packet (i.e., without a match-action entry in the on-NIC match-action table). The queuing logic can send an unmatched packet (e.g., packet 5) to both a packet-class-specific queue based on the class of the packet and fill-request queue 302.

Figure 3B:
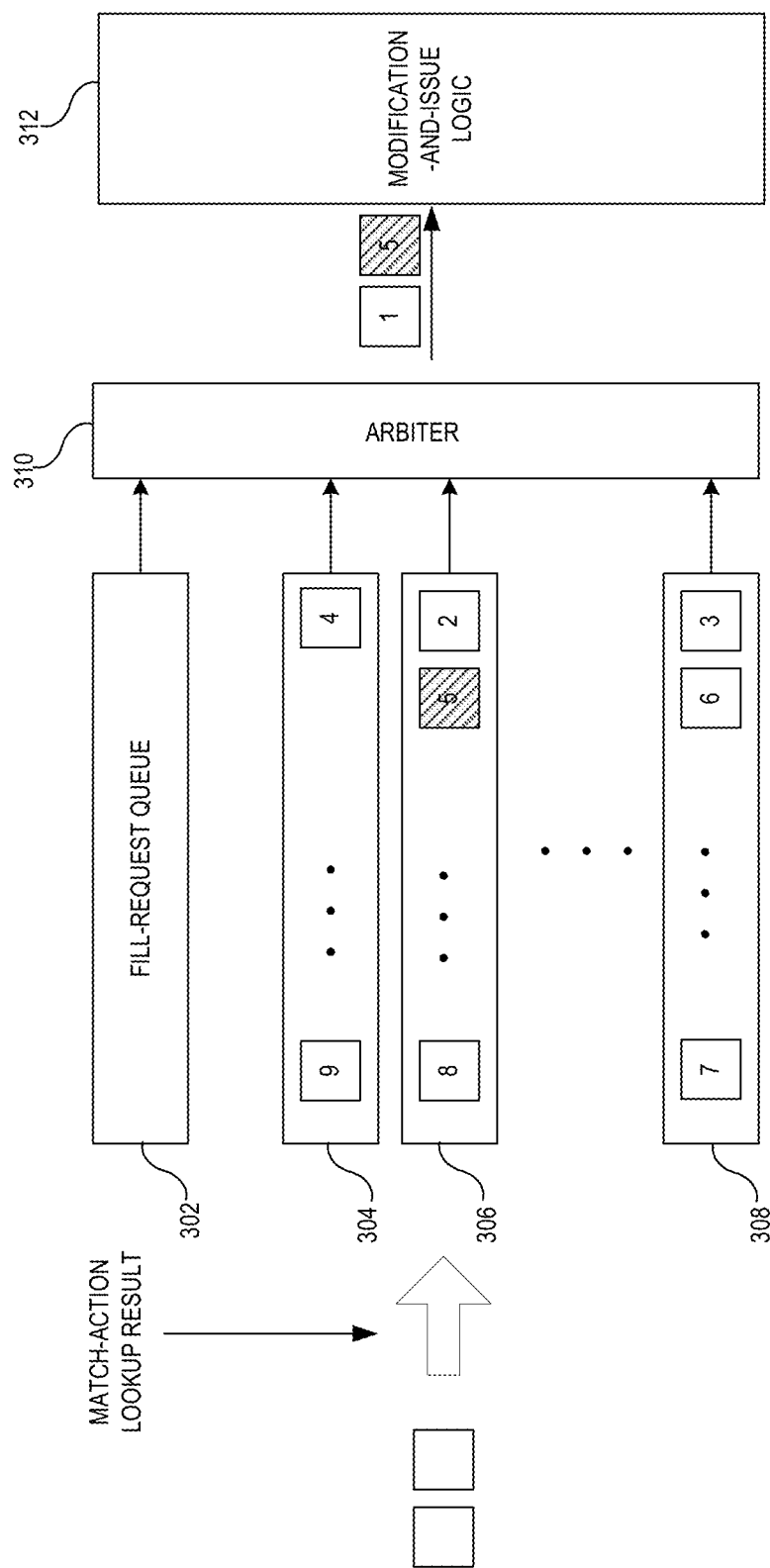

An arbiter 310 can select, from the plurality of queues 302-308, one queue at a time for dequeuing. According to some aspects, the dequeue operation can be based on priority, where packets in queues with higher priorities are removed before packets in queues with lower priorities. To reduce the delay of an unmatched packet while it is waiting for the fill response, fill-request queue 302 can be granted a relatively higher priority. According to one aspect, fill-request queue 302 can be granted the highest priority among all the queues. FIG. 3B shows that, due to the high priority of fill-request queue 302, unmatched packet 5 is removed from fill-request queue 302 before other packets (e.g., packet 1) are removed from their corresponding queues. Packets removed from the queues are sent to modification-and-issue logic 312, which is responsible for performing appropriate actions on the packets before issuing the packets.

Figure 3C:
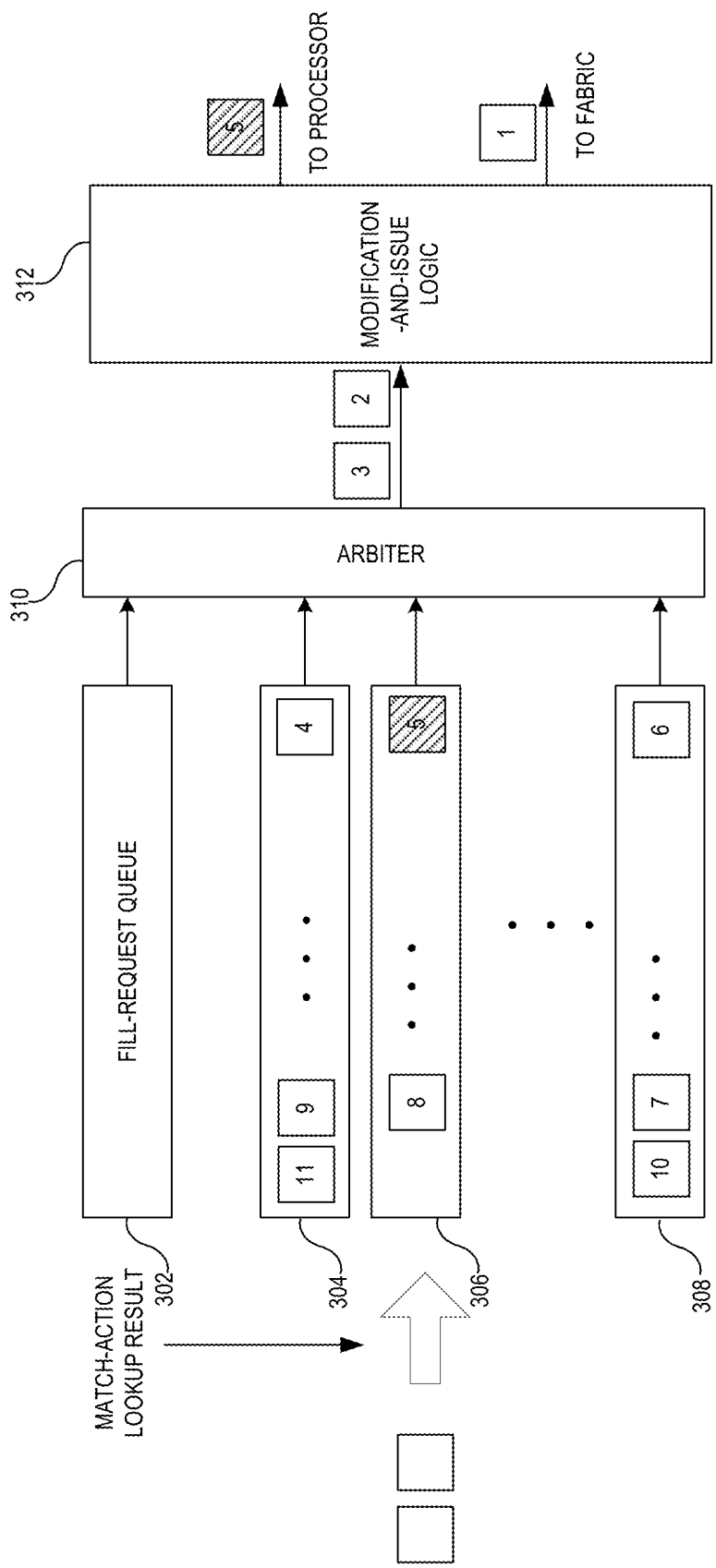

FIG. 3C shows that unmatched packet 5 is sent to a processor, whereas matched packet 1 is issued to the fabric (after modification-and-issue logic 312 performs the appropriate actions on packet 1). To reduce the bandwidth usage, instead of sending the entire unmatched packet 5 to the processor, a truncated portion of packet 5 that includes the packet header can be sent to the processor to allow the processor to perform a match-action lookup in a larger match-action table stored in the memory of the processor using the packet header as a search key. As can be seen in FIG. 3C, packet 5 can be treated by the packet engine (which can include queues 302-308, arbiter 310, and modification-and-issue logic 312) in a way similar to a matched packet, except it is sent to the processor not the fabric. In other words, unmatched packet 5 can flow though the packet engine although its does not yet have a match-action entry. While unmatched packet 5 in fill-request queue 302 flows through the packet engine and leaves the packet pipeline to have its request handled by the processor, unmatched packet 5 in packet-class-specific queue 306 remains in the queue, waiting for the fill response to be returned by the processor. If the unmatched packet is at the head of its queue but the fill response is not yet received by the packet engine, the corresponding packet-class-specific queue may be blocked by the unmatched packet. However, packets from other packet-class-specific queues (e.g., packets 2 and 3) can continue to flow through the traffic engine as normal, without interruption or blocking. By designing queues that are sufficiently deep and by granting a relatively higher property to fill-request queue, the disclosed solution can ensure that the likelihood of an unmatched packet blocking its packet-class-specific queue can be quite low. According to some aspects, the time needed to obtain the fill response (i.e., the time needed for the processor to perform the lookup and return the lookup result) can be a few microseconds and the queue depth can be designed accordingly. According to one aspect, each packet-class-specific queue can hold up to 512 entries.

Figure 3D:
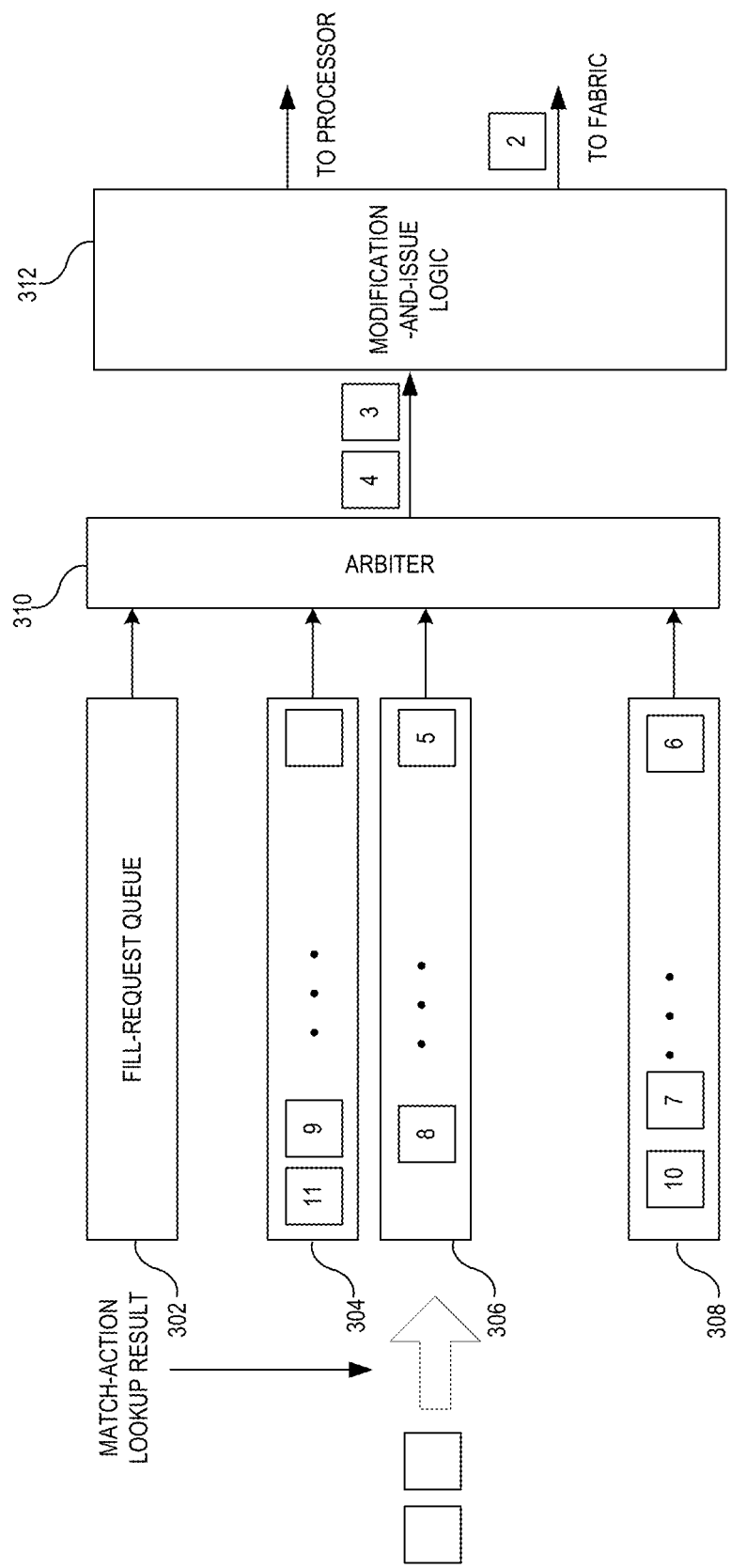

FIG. 3D shows that the fill response has been received by the packet engine, and packet 5 in packet-class-specific queue 306 can be treated by arbiter 310 like a regular packet (i.e., it can be removed from packet-class-specific queue 306 like a regular packet). In FIG. 3D, packet 5 is no longer shaded, meaning that it now has a match-action entry. FIG. 3D also shows that the order of packet transmission in each packet class remains unchanged (e.g., packet 5 is transmitted after packet 2).

As can be seen from FIGS. 3A-3D, the disruption to the flows of packets caused by the unmatched packet can be kept at a minimum while a fill request is pending (meaning that the corresponding unmatched packet is waiting for the match-action lookup fill-response result). By queuing the packets according to their classes, the solution ensures that an unmatched packet does not affect the flow of packets in other classes. Moreover, the unmatched packet does not block the flow of packets in the same class (e.g., the same traffic class or priority class) unless it has reached the head of its queue before the fill response is returned to the traffic engine. By implementing the additional fill-request queue with a high priority, the solution can also minimize the delay of the fill response, thus reducing the likelihood of a queue being blocked by the unmatched queue.

Figure 3E:
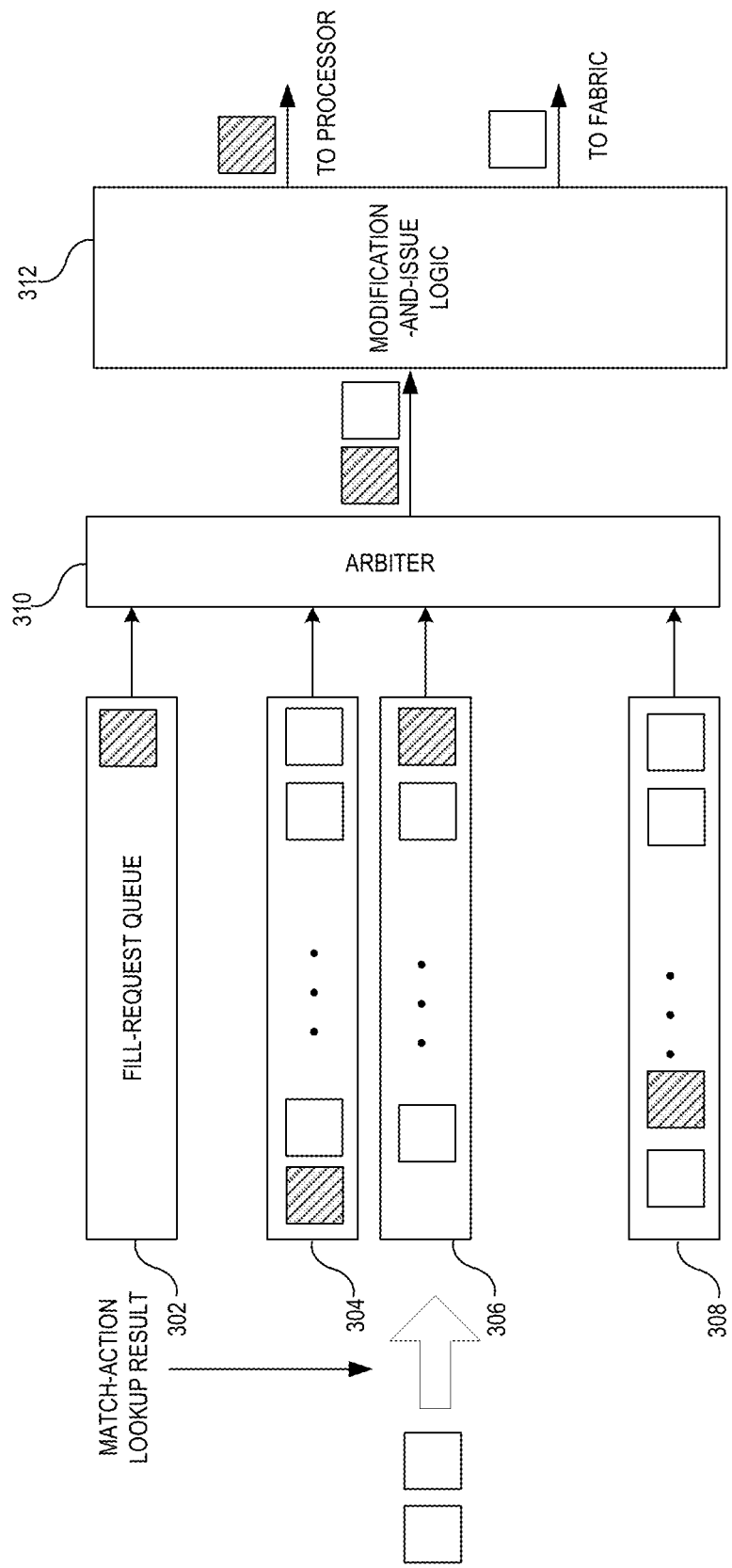

In the examples shown in FIGS. 3A-3D, there exists only one unmatched packet waiting for the return of the fill response. In practice, it is also possible that there can be multiple unmatched packets simultaneously pending (i.e., waiting for the return of the fill responses) in the packet engine. FIG. 3E shows multiple unmatched packets (i.e., the shaded packets) waiting to be processed in the various queues. Note that one pending packet does not prevent other unmatched packets (which can be from the same or different classes) from issuing fill requests to the processor, as the fill requests are issued from fill-request queue 302 not the packet-class-specific queues.

Figure 4:
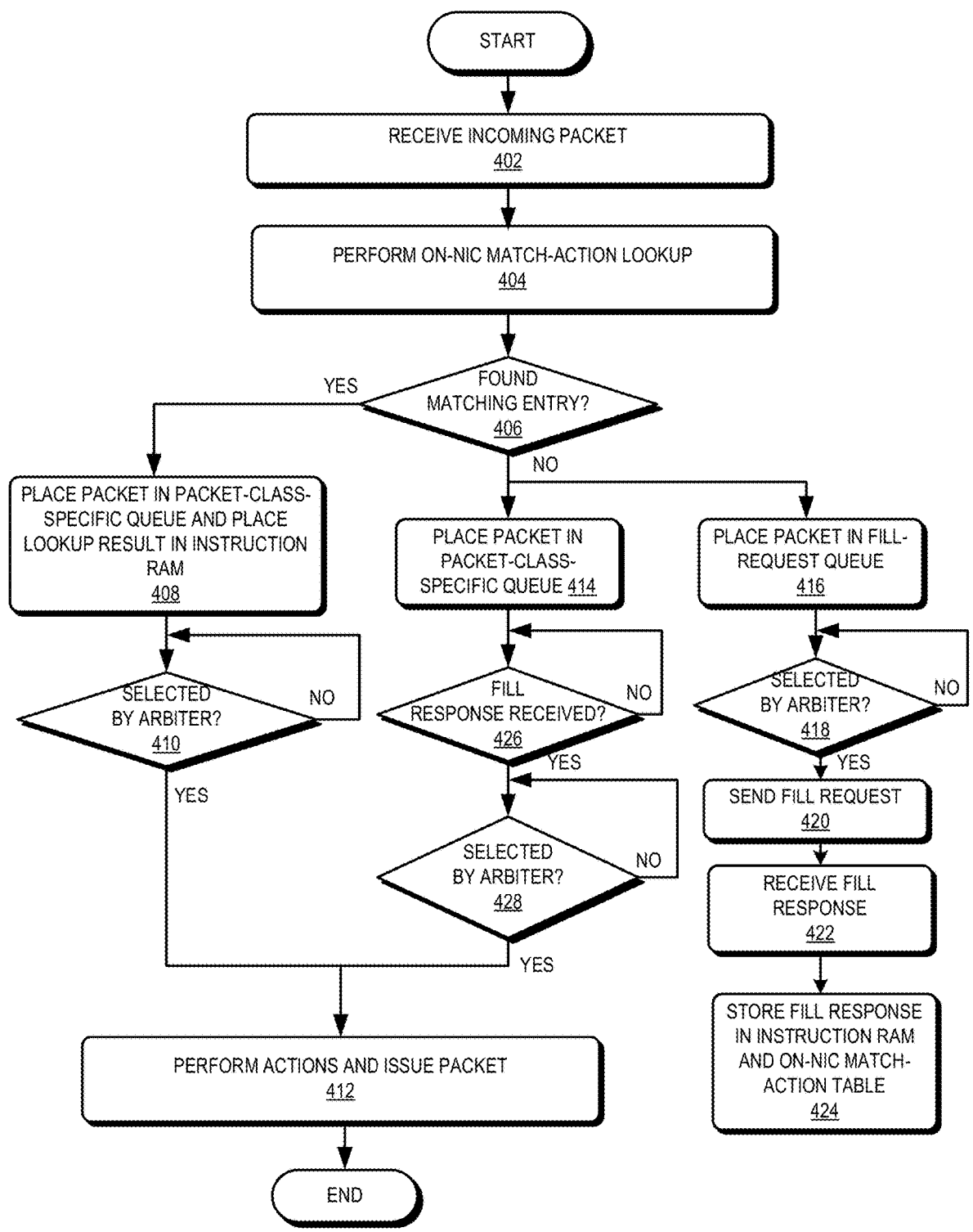
FIG. 4 presents a flowchart illustrating an example of a packet-processing operation performed by the packet engine on a network interface card (NIC), according to one aspect.

FIG. 4 presents a flowchart illustrating an example of a packet-processing operation performed by the packet engine on the NIC, according to one aspect. During operation, the hardware-based packet engine can receive an incoming packet (operation 402) and perform a match-action lookup in an on-NIC match-action table based on the header information of the packet (operation 404). The on-NIC match-action table can be implemented as a hash table stored in a memory on the NIC. Due to the area constraint, the size of the on-NIC match-action table can be relatively small (e.g., a few megabytes). The packet engine can determine whether a match is found in the on-NIC match-action table (operation 406). If so, the packet engine can place the packet in a corresponding packet-class-specific queue based on the packet class (e.g., the traffic class) of the packet and place the match-action lookup result (which can include data associated with the action to be performed on the packet) in an instruction RAM (operation 408). For example, the lookup result can specify the action(s) to be performed on the packet before it is issued to the fabric. The packet waits in the packet-class-specific queue before being selected by the arbiter (operation 410). Once the packet is selected, the traffic engine can perform the appropriate action(s) on the packet based on the lookup result and issue the packet (operation 412).

If the on-NIC match-action lookup results in a miss (i.e., no matching entry is found in the on-NIC match-action table), in addition to placing the packet in a corresponding packet-class-specific queue based on its packet class determined according to a predefined packet-classification criterion (operation 414), the traffic engine can place the packet in a special fill-request queue (operation 416). The packet can advance in both queues. The fill-request queue typically has fewer packets in queue and a higher priority, such that the packet is dequeued from the fill-request queue before it is dequeued from the packet-class-specific queue. Once reaching the head of the fill-request queue, the packet can wait for arbitration (operation 418). After the arbiter selects the packet from the fill-request queue, the traffic engine can perform a default action on the packet, which is to send a fill request that includes at least the header of the packet to a process (e.g., the fill-request handler) executing on the management processor (operation 420). According to some aspects, the traffic engine may truncate the packet and send a predetermined number of initial bytes of the packet to the management processor. Sending just the initial portion of the packet instead of the entire packet to the processor can reduce the bandwidth consumption by the communication between the NIC and the processor. The management processor can be the host processor of the NIC or a separate processor that is either attached to the NIC via a side port or coupled to the NIC via the fabric. It is also possible that, instead of a general-purpose processor, the fill request (e.g., the packet header) can be sent to a specialized controller circuitry that has a relatively large (e.g., beyond gigabytes) memory.

The processor (or specialized controller circuitry) can perform a match-action lookup in a larger off-NIC match-action table (e.g., a hash table) stored in its memory based on the received fill request and generate and return the fill response to the NIC. The fill response can include the match-action lookup result from the larger match-action table. Note that if the larger match-action table does not have a matching entry, the packet header may be forwarded to an exception handler that processes the packet based on a set of pre-defined rules. For example, the packet may be dropped.

The packet engine receives the fill response, which can include the off-NIC match-action lookup result, from the processor (operation 422). According to some aspects, the receiving logic in the packet engine can receive the fill response in a way similar to receiving the incoming packet. More specifically, the receiving logic can include a multiplexer that multiplexes the incoming packet and the fill response. The packet engine can also store the fill response in the instruction RAM and in the on-NIC match-action table as a new match-action entry (operation 424). Storing this off-NIC match-action lookup result in the on-NIC match-action table can facilitate the efficient processing of subsequently received packets with similar headers.

In the meantime, the same packet advances in the packet-class-specific queue. When the packet reaches the head of the packet-class-specific queue, the traffic engine determines whether the corresponding fill response for the packet has been received (operation 426). According to some aspects, the packet engine can search the instruction memory for a stored match-action entry for the packet. If no such entry is found, the fill response is not yet received, and the packet waits in the packet-class-specific queue. If the fill response has been received, the packet can wait for arbitration (operation 428). If the packet is selected by the arbiter, traffic engine can perform the appropriate actions on the packet and issue the packet (operation 412). More specifically, the packet engine can perform the actions based on the off-NIC lookup result stored in the instruction memory.

By offloading some of the match-action lookups to a processor, the disclosed solution makes it possible to realize a nearly arbitrarily large match-action table, thus being capable of supporting a large number of tenants sharing the NIC. Moreover, the management process running in the processor can provide table management to support dynamic offload of functionalities such as management of stateful packet-processing rules, which can enhance node security.

Figure 5:
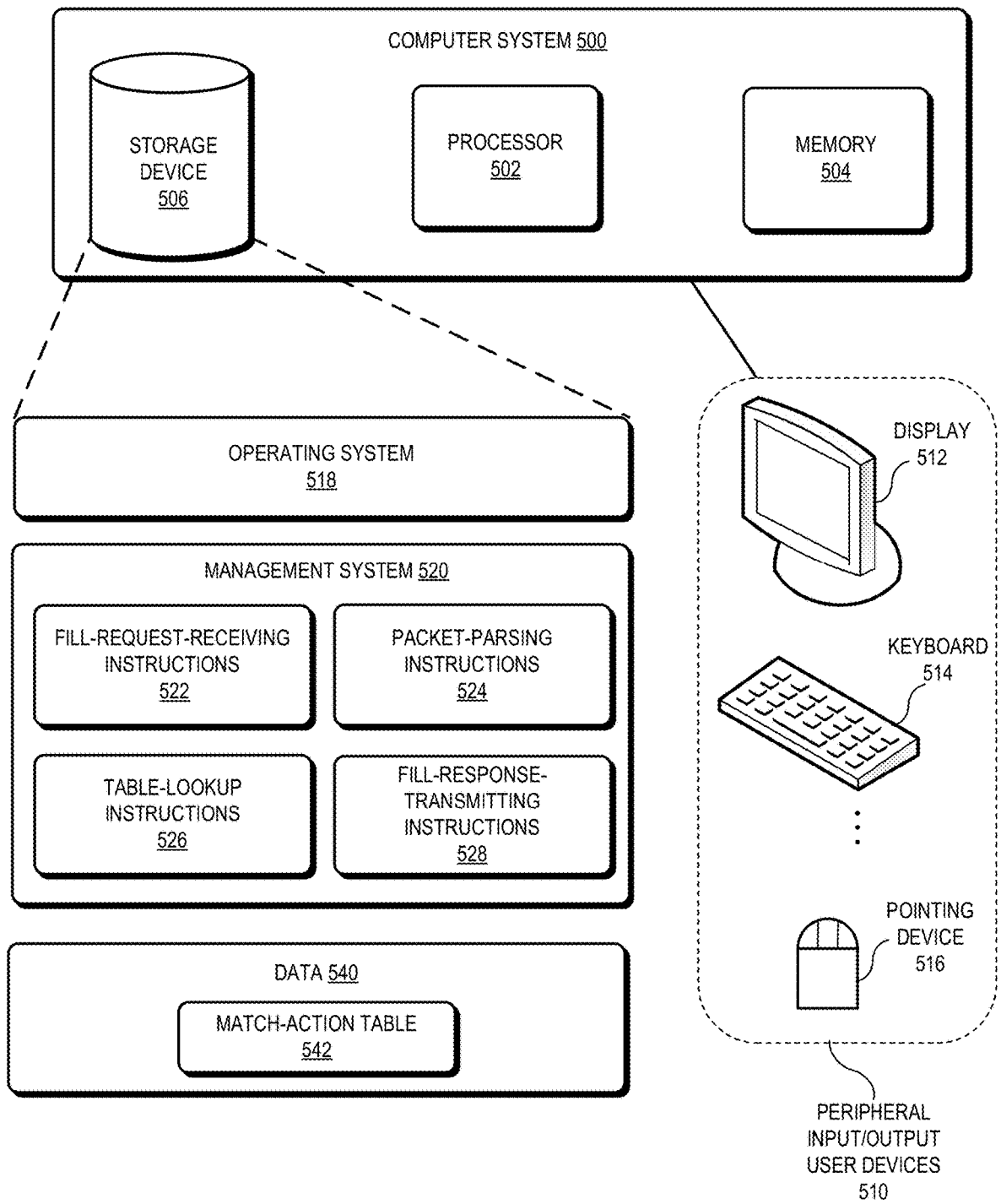
FIG. 5 illustrates an example of a computer system that facilitates the off-NIC match-action lookup, according to one aspect.

FIG. 5 illustrates an example of a computer system that facilitates the off-NIC match-action lookup, according to one aspect. Computer system 500 includes a processor 502, a memory 504, and a storage device 506. Furthermore, computer system 500 can be coupled to peripheral input/output (I/O) user devices 510, e.g., a display device 512, a keyboard 514, and a pointing device 516. Storage device 506 can store an operating system 518, a management system 520, and data 540.

Management system 520 can include instructions, which when executed by computer system 500, can cause computer system 500 or processor 502 to perform methods and/or processes described in this disclosure. Specifically, by executing these instructions, computer system 500 can implement the various functionalities for performing an off-NIC match-action lookup operation. Management system 520 can include instructions for receiving a fill request (fill-request-receiving instructions 522), instructions for parsing a packet to extract header information (packet-parsing instructions 524), instructions for looking up the off-NIC match-action table based on the extracted header information (table-lookup instructions 526), and instructions for transmitting the fill response to the packet engine on the NIC (fill-response-transmitting instructions 528). Data 540 can include a match-action table 542.

In general, the disclosure can provide the solution to offload a portion of the match-action lookup operation from a NIC with limited memory resources to a processor with a large memory, thus allowing the NIC to support a large number of tenants. When the match-action lookup performed for a packet in the on-NIC match-action table results in a miss, the packet can be queued in two separate queues, one packet-class-specific queue for queuing all packets belonging to the same packet class (e.g., the same traffic class) and one fill-request or miss queue for queueing packets without a matching entry in the on-NIC match-action table. Packets in the fill-request queue can have a higher priority during arbitration, meaning that they can be selected for issuing before packets in other packet-class-specific queues. A packet selected from the fill-request queue will be issued to a management process in the processor as a fill request. The fill request can include the packet header, thus facilitating the management process in performing a lookup operation in a larger off-NIC match-action table stored in the processor's RAM. The off-NIC match-action lookup result can be returned to the traffic engine on the NIC, following the same path of the incoming traffic. The off-NIC match-action lookup result can be used to process the unmatched packet, which is waiting in the packet-class-specific queue. Moreover, the off-NIC match-action lookup result can be used to "fill" an entry for the packet in the on-NIC match-action table to facilitate processing of similar packets arriving at the NIC in the future.

Queuing the unmatched packet in both queues allows the unmatched packet to maintain its position within the flow of the corresponding class while waiting for the off-NIC match-action lookup result to be returned from the processor. Queuing all packets based on their classes can ensure the independent flow of each class. A miss by the on-NIC match-action lookup in one class does not prevent the flow of other classes. In the examples shown in FIGS. 1-3, the incoming packets to the NIC are outbound packets, meaning that they are from the processor and will be issued to the fabric. A similar traffic engine can also be used to process inbound packets, meaning that they are from the fabric and are heading toward the host processor of the NIC. The NIC may include two hardware-based traffic engines, one for inbound traffic and one for outbound traffic.

One aspect can provide a method for processing packets. The method can include performing a lookup operation in a first match-action table located on a network interface card (NIC) based on a header of a received packet; in response to finding a matching entry indicating an action to be performed on the received packet, queuing the received packet in a first queue and storing data associated with the action in an instruction memory on the NIC; and in response to not finding a matching entry in the first match-action table, queuing the received packet in both the first queue and a second queue. The method can further include selecting a first packet from the first queue for processing, the processing comprising performing a corresponding action indicated by data stored in the instruction memory; selecting a second packet from the second queue for processing, the processing comprising forwarding at least a portion of the second packet to a processor coupled to the NIC to allow the processor to perform a second lookup operation in a second match-action table; and receiving, from the processor, a lookup result of the second lookup operation indicating an action to be performed on the second packet, thereby allowing a third packet in the first queue and corresponding to the second packet to be processed based on the lookup result.

In a variation on this aspect, the first match-action table can include a hash table stored in a memory located on the NIC.

In a variation on this aspect, the second match-action table is larger than the first match-action table, and the second match-action table can be stored in a memory associated with the processor.

In a variation on this aspect, the second queue has a higher priority than the first queue. Forwarding the portion of the second packet can include truncating the second packet to obtain a predetermined number of initial bytes of the second packet, which can include a header of the second packet, and forwarding the predetermined number of initial bytes of the second packet to a management process executed by the processor.

In a variation on this aspect, the method can further include storing the received lookup result of the second lookup operation in the first match-action table.

In a further variation, the method can further include removing one or more old entries in the first match-action table to provide space for storing the received lookup result.

In a variation on this aspect, the first queue is a packet-class-specific queue, and the method can further include queuing received packets of different packet classes to different packet-class-specific queues.

In a variation on this aspect, the method can further include storing the lookup result of the second lookup operation in the instruction memory.

In a further variation, the method can further include, in response to the third packet in the first queue being selected for processing, determining whether the lookup result is stored in the instruction memory; and in response to determining that the lookup result is stored in the instruction memory, performing the action indicated by the lookup result on the third packet.

In a further variation, the method can further include, in response to determining that the lookup result is not stored in the instruction memory, keeping the third packet in the first queue.

One aspect can provide a packet engine located on a network interface card (NIC) for processing packets. The packet engine can include a first match-action table comprising a plurality of match-action entries, a lookup logic to perform a lookup operation in the first match-action table based on a header of a received packet, an instruction memory to store a result of the lookup operation indicating an action to be performed on the received packet, a queuing logic to queue the received packet in a first queue in response to the lookup logic finding a match-action entry corresponding to the header of the received packet and to queue the received packet in both the first queue and a second queue in response to the lookup logic not finding the match-action entry, and an arbiter to select, from a plurality of queues comprising the first queue and the second queue, a packet for processing. The packet engine can include a packet-processing logic to perform, on a first packet selected from the first queue, a corresponding action based on data stored in the instruction memory, and forward at least a portion of a second packet selected from the second queue to a processor coupled to the NIC to allow the processor to perform a second lookup operation in a second match-action table. The packet engine can further include a receiving logic to receive, from the processor, a lookup result of the second lookup operation indicating an action to be performed on the second packet, thereby allowing a third packet in the first queue corresponding to the second packet to be processed based on the lookup result.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware apparatus. The hardware apparatus can include, but are not limited to, application-specific integrated circuit (ASIC) chips, field-programmable gate arrays (FPGAs), dedicated or shared processors that execute a particular software component or a piece of code at a particular time, and other programmable-logic devices now known or later developed. When the hardware apparatus are activated, they perform the methods and processes included within them.

The foregoing descriptions of embodiments have been presented for purposes of illustration and description only. They are not intended to be exhaustive or to limit the scope of this disclosure to the forms disclosed. Accordingly, many modifications and variations will be apparent to practitioners skilled in the art.

What is claimed is:

1. A method, comprising:
performing, by a network interface controller (NIC), a first lookup operation in an on-NIC match-action table based on a header of a received packet;
in response to finding a matching entry in the on-NIC match-action table, processing the received packet based on an action indicated in the matching entry;
in response to not finding a matching entry in the on-NIC match-action table, forwarding at least a portion of the received packet to a processor coupled to the NIC;
receiving, from the processor, a result of a second lookup operation performed in an off-NIC match-action table, the result indicating a second action; and
processing the received packet based on the second action.

2. The method of claim 1, further comprising:
in response to finding the matching entry in the on-NIC match-action table, queuing the received packet in a first queue and storing data associated with the action in an instruction memory on the NIC.

3. The method of claim 2, wherein the first queue is a packet-class-specific queue, and wherein the method further comprises queuing packets of different classes to different packet-class-specific queues.

4. The method of claim 2, further comprising:
in response to not finding the matching entry in the on-NIC match-action table, queueing the received packet in both the first queue and a second queue.

5. The method of claim 4, further comprising performing an arbitration operation to select, from the first and second queues, a packet for processing, wherein the second queue has a higher priority than the first queue.

6. The method of claim 5, wherein processing a packet selected from the second queue comprises:
truncating the packet to obtain a predetermined number of initial bytes of the packet; and
forwarding the predetermined number of initial bytes of the packet to the processor to facilitate the processor to perform the second lookup operation.

7. The method of claim 1, further comprising storing the result of the second lookup operation in the on-NIC match-action table.

8. The method of claim 7, further comprising removing one or more existing entries from the on-chip match-action table to provide space for storing the result of the second lookup operation.

9. The method of claim 1, wherein the off-NIC match-action table is larger than the on-NIC match-action table, and wherein the off-NIC match-action table is stored in a memory associated with the processor.

10. A network interface controller (NIC), comprising:
an on-NIC match-action table comprising a plurality of match-action entries;
a lookup logic to perform a first lookup operation in the on-NIC match-action table based on a header of a received packet; and
a packet-processing logic to:
in response to the lookup logic finding a matching entry in the on-NIC match-action table, process the received packet based on an action indicated in the matching entry;
in response to the lookup logic not finding a matching entry in the on-NIC match-action table, forward at least a portion of the received packet to an off-NIC processor;
receive, from the off-NIC processor, a result of a second lookup operation performed in an off-NIC match-action table, the result indicating a second action; and
process the received packet based on the second action.

11. The NIC of claim 10, further comprising:
a queuing logic to queue the received packet in a first queue in response to the lookup logic finding the matching entry in the on-NIC match-action table; and
an instruction memory for storing data associated with the action.

12. The NIC of claim 11, wherein the first queue is a packet-class-specific queue, and wherein the method further comprises queuing packets of different classes to different packet-class-specific queues.

13. The NIC of claim 11, wherein the queuing logic is to:
in response to the lookup logic not finding the matching entry in the on-NIC match-action table, queue the received packet in both the first queue and a second queue.

14. The NIC of claim 13, further comprising an arbiter to perform an arbitration operation to select, from the first and second queues, a packet for processing, wherein the second queue has a higher priority than the first queue.

15. The NIC of claim 14, wherein, while processing a packet selected from the second queue, the packet-processing logic is to:
truncate the packet to obtain a predetermined number of initial bytes of the packet; and
forward the predetermined number of initial bytes of the packet to the processor to facilitate the processor to perform the second lookup operation.

16. The NIC of claim 10, further comprising a table-update logic to store the result of the second lookup operation in the on-NIC match-action table.

17. The NIC of claim 16, wherein the table-update logic is to remove one or more existing entries from the on-chip match-action table to provide space for storing the result of the second lookup operation.

18. The NIC of claim 10, wherein the off-NIC match-action table is larger than the on-NIC match-action table, and wherein the off-NIC match-action table is stored in a memory associated with the off-NIC processor.

19. A non-transitory computer-readable storage medium storing instructions to:
perform, by a network interface controller (NIC), a first lookup operation in an on-NIC match-action table based on a header of a received packet;
in response to finding a matching entry in the on-NIC match-action table, process the received packet based on an action indicated in the matching entry;
in response to not finding a matching entry in the on-NIC match-action table, forward at least a portion of the received packet to a processor coupled to the NIC;
receive, from the processor, a result of a second lookup operation performed in an off-NIC match-action table, the result indicating a second action; and
process the received packet based on the second action.

20. The non-transitory computer-readable storage medium of claim 19, wherein the instructions are further to:
in response to finding the matching entry in the on-NIC match-action table, queue the received packet in a first queue and storing data associated with the action in an instruction memory on the NIC;
in response to not finding the matching entry in the on-NIC match-action table, queueing the received packet in both the first queue and a second queue; and performing an arbitration operation to select, from the first and second queues, a packet for processing, wherein the second queue has a higher priority than the first queue.

\* \* \* \* \*